US008534685B1

(12) United States Patent
Tohm, Sr.

(10) Patent No.: US 8,534,685 B1
(45) Date of Patent: Sep. 17, 2013

(54) ROLLER ASSEMBLY FOR TRAVELING OVER SURFACES

(71) Applicant: Fred A. Tohm, Sr., Chattaroy, WA (US)

(72) Inventor: Fred A. Tohm, Sr., Chattaroy, WA (US)

( * ) Notice: Subject to any disclaimer, the term of this patent is extended or adjusted under 35 U.S.C. 154(b) by 0 days.

(21) Appl. No.: 13/625,941

(22) Filed: Sep. 25, 2012

(51) Int. Cl.
*B62M 1/00* (2010.01)

(52) U.S. Cl.
USPC .............................. 280/87.021; 280/87.051

(58) Field of Classification Search
USPC ................. 280/87.021, 650, 87.051, 87.041, 280/43.24, 79.11; 297/148, 344.2, 5, DIG. 4
See application file for complete search history.

(56) References Cited

U.S. PATENT DOCUMENTS

| | | | | |
|---|---|---|---|---|
| 597,025 | A * | 1/1898 | Schwartz | 280/843 |
| 4,503,943 | A * | 3/1985 | Tsukui | 188/5 |
| 4,621,804 | A * | 11/1986 | Mueller | 280/87.041 |
| 4,822,030 | A * | 4/1989 | Cone | 280/87.051 |
| 5,219,058 | A * | 6/1993 | Sundseth | 16/26 |
| 5,409,265 | A * | 4/1995 | Douglass | 280/843 |
| 5,716,074 | A * | 2/1998 | Theodorou | 280/843 |
| 5,813,681 | A * | 9/1998 | Saint et al. | 280/87.051 |
| 6,120,045 | A * | 9/2000 | Rosko | 280/87.051 |
| 6,220,620 | B1 * | 4/2001 | Harroun | 280/650 |
| 6,854,159 | B2 * | 2/2005 | Ruitenbeek | 16/18 R |
| 7,185,949 | B2 * | 3/2007 | Finell | 297/148 |
| 7,287,768 | B2 * | 10/2007 | Myers et al. | 280/87.051 |
| 7,673,942 | B2 * | 3/2010 | Tuckey et al. | 297/344.22 |
| 8,011,307 | B2 * | 9/2011 | Marcelli | 108/55.3 |
| 2005/0248110 | A1 * | 11/2005 | Stouffer | 280/87.021 |

* cited by examiner

*Primary Examiner* — Hau Phan
(74) *Attorney, Agent, or Firm* — John C. Meline

(57) ABSTRACT

Described is a mechanism for traveling over carpet and other uneven or resistant surfaces and objects. The mechanism may be used in connection with office chairs, desk chairs, school chairs, dinner table chairs, lounge chairs, shopping carts, and the like. A base assembly includes relatively large spheres of a rigid or pliant material. The spheres operate in any direction with the assistance of a set of bearings. The spheres allow improved operation over surfaces compared to castors and other known mechanisms. The spheres substantial reduce floor wear and provide improved stability.

19 Claims, 5 Drawing Sheets

US 8,534,685 B1

ROLLER ASSEMBLY FOR TRAVELING OVER SURFACES

FIELD OF INVENTION

The present invention relates to a system or components that may be affixed or used in conjunction with chairs, carts and other objects; the system allows or facilitates rolling over or across surfaces such as floors, patios, carpets, etc.

BACKGROUND

Known office chairs, couches, refrigerators, tables, shopping carts and other movable appliances and furniture sometimes include wheels or castors. These wheels or castors are typically mounted at several locations in the items. The wheels or castors facilitate movement of these items without lifting them. However, when these items are moved across a carpeted or rough surface, the wheels or castors do not sufficiently enable movement. Upon impact with a pebble or other small obstacle, a wheel or castor suddenly stops and motion of the item ceases. Instead, movers frequently choose to lift and carry the item over a rough surface because the set of wheels or castors fails to adequately facilitate movement, especially of heavy or bulky items. Carrying some items even a short distance allows for a person to hurt himself when carrying a bulky or heavy item.

The present invention solves these and other shortcomings and problems.

SUMMARY

In one implementation, spheres are disposed somewhat uniformly in or about a base. The base is connected to or forms part of a design for a chair, desk, couch, appliance, table, shopping cart, and the like.

In one aspect of the present invention, the base provides increased stability as compared to known castors, wheels, etc. The increased stability derives from, for example, (1) one or more properties of the material that makes up the spheres, (2) increased strength of the design of the base, and/or (3) increased points of contact with a surface. One result of the increased stability is that a chair or cart is more difficult to roll over. Further, there is increased stability due to the spheres being able to travel more easily than previously known over uneven surfaces or objects.

Another aspect of the invention provides for a system that facilitates movement of office chairs, desks, couches, refrigerators, tables, shopping carts and other movable appliances, furniture and the like. With less surface area in contact with a surface, and with relatively less rolling friction, the base or apparatus travels with less lateral force needed to start and move it.

In another aspect, the spheres cause less wear on surfaces such as carpets and rugs. For an embodiment with spheres, reduced wear derives at least in part from the shape of the spheres and type of contact between a surface and the spheres.

This Summary is provided to introduce a selection of concepts in a simplified form that are further described below in the Detailed Description. This Summary is not intended to identify key or essential features of the claimed subject matter, and it is not intended to be used to limit the scope of the claimed subject matter. These and other aspects of the invention are described further in the Detailed Description.

BRIEF DESCRIPTION OF THE DRAWINGS

The novel features believed characteristic of the subject matter are set forth in the appended claims. Throughout, like numerals refer to like parts with the first digit of each numeral generally referring to the figure which first illustrates the particular part. The subject matter and one or more preferred modes of use are best understood by reference to the following Detailed Description of illustrative implementations when read in conjunction with the accompanying drawings. Unless noted otherwise, the figures are not drawn to scale.

DETAILED DESCRIPTION

While the invention is described below with respect to one or more preferred implementations, other implementations are possible. The concepts disclosed herein apply equally to other mechanisms, devices and means for traveling across surfaces. Furthermore, the concepts applied herein apply generally to furniture, carts, dollies, appliances, manually operated delivery devices, conveyor systems, and other items that move relatively short distances across surfaces. The invention is described below with reference to the accompanying figures.

Historically, while various forms and types of castors and wheels have been created to facilitate movement or transport of objects over surfaces (e.g., office chairs, shopping carts), these mechanisms fail to adequately address some basic functionalities. For example, office chairs often cause wear to carpet when used for months in a relatively small part of a carpeted office. The castors and wheels of office chairs sometimes catch on edges and obstacles, and occasionally tip over or cause frustration to users. Due to substantial friction or resistance, some users suffer frustration with moving office chairs back and forth across a carpeted surface. Thus, there has been a need for an improved mechanism that can overcome these and other shortcomings.

Figure 1:
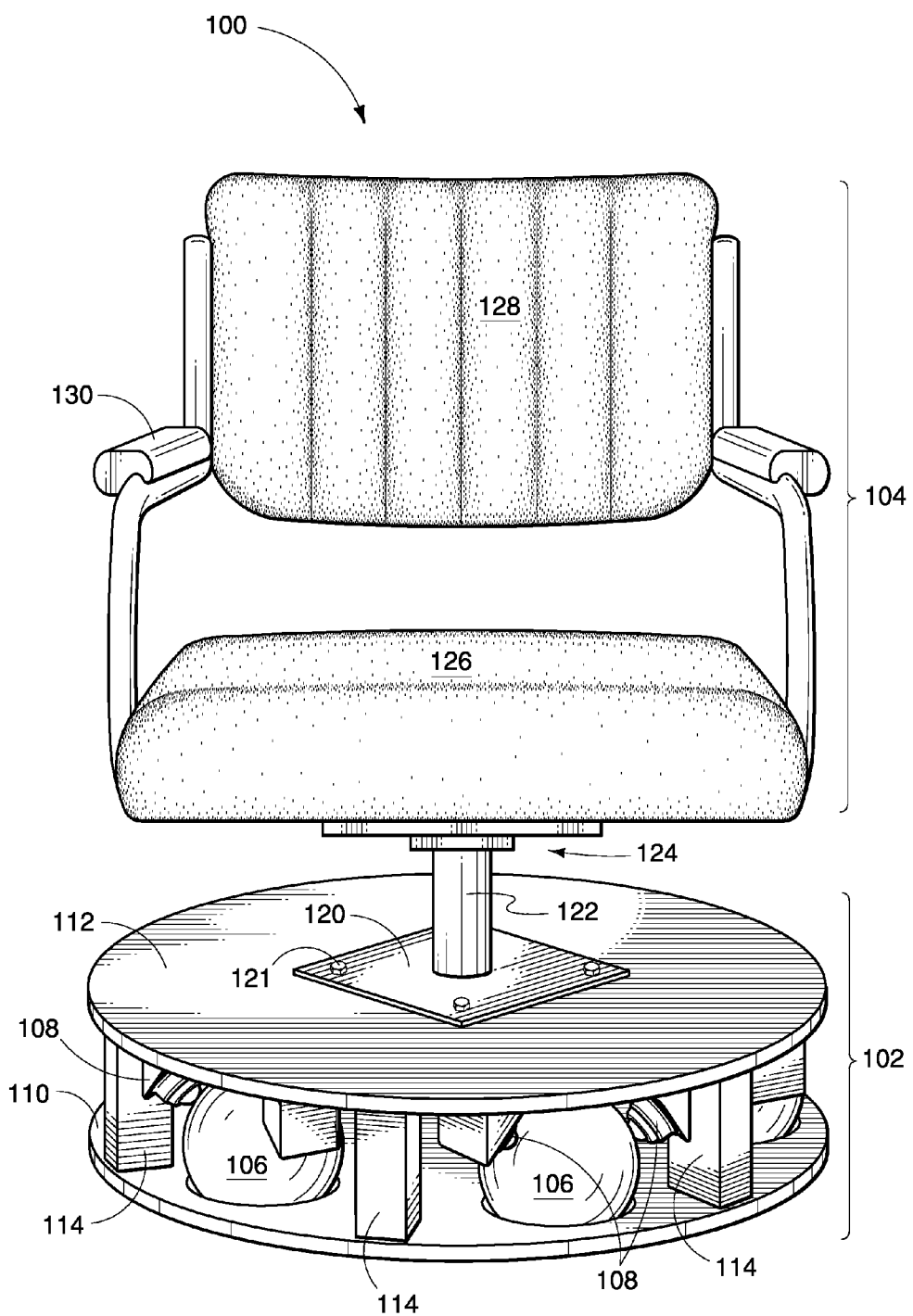
FIG. 1 is a front perspective view of an office chair or assembly according to a first exemplary implementation of the invention.

FIG. 1 is a front perspective view of an office chair according to a first exemplary implementation of an assembly 100. With reference to FIG. 1, a base 102 supports a utility portion or utility apparatus 104 such as a chair (shown in FIG. 1). The utility portion or apparatus 104 can take a variety of forms including a basket, couch, bed, night stand, bar stool, shopping cart, microwave stand, refrigerator, footstool, chest, tool chest, table, desk, computer stand, locker, bookshelf, etc.

The base 102 comprises or includes a set of spherical or substantially spherical rollers or balls 106 (herein "spheres"). In one implementation, the spheres 106 operate and/or are held in place by a set of relatively smaller bearings or ball transfers 108. For example, each bearing or bearing assembly may be a ball transfer or hudson-style bearing (as seen and described in more detail with reference to FIG. 3). Each ball transfer 108 may support a substantial amount of weight depending on the application of the base 102. The base 102 also includes a bottom plate or area 110 and a top plate or area 112. Support members 114 hold the bottom plate 110 in place relative to the top plate 112. Each support member 114 may be of any shape or design, and may be moveable or adjustable such that the distance between the bottom plate 110 and the top plate 112 may be adjusted as desired or as needed. Further, a break mechanism or lock mechanism may be integrated with or work in conjunction with the support members 114.

The spheres 106 protrude through the bottom plate 110 and make contact with a surface (not shown). The inventive assembly 100 is free to roll or travel in any direction. If the assembly 100 is picked up, the bottom plate 110 captures or restrains the spheres 106 from leaving the base 102.

Each sphere 106 is preferably made of a firm substance that does not easily or substantially deform, break or chip; and does not leave a residue or mark when contacting surfaces. For example, spheres may be made of one or more plastics, acrylic glass, one or more acrylate polymers, polyvinyl chloride (PVC), hardened rubber, one or more phenolic resins, one or more polyesters, nitrocellulose, or other material including metals, woods, stone and natural and man-made materials. In some embodiments, the spheres may be made of a resilient material more akin to a rubbery substance so as to give a higher rolling friction and better rolling characteristics over tile and other hard surfaces. In yet other embodiments, the spheres may be filled with a liquid or a gas, or may be inflatable.

The base 102 is connected or used in conjunction with a utility piece 104 through a connecting assembly. In one implementation, the connecting assembly includes a connecting plate 120 that is fastened to the top plate 112 with one or more fasteners 121. One or more posts 122 connect to a connecting mechanism 124. In the example shown in FIG. 1, the post 122 is an adjustable post 122 and a connecting mechanism 124 that attaches to a seat 126 of an office chair. The office chair includes a back 128 and arms 130. In this example of an office chair, the base 102 is sized to an ergonomic size such that a width of the base 102 is sufficient to provide substantial stability when considering leaning and tilting on the office chair. The base 102 may not be considered shown to scale in FIG. 1.

Figure 2:
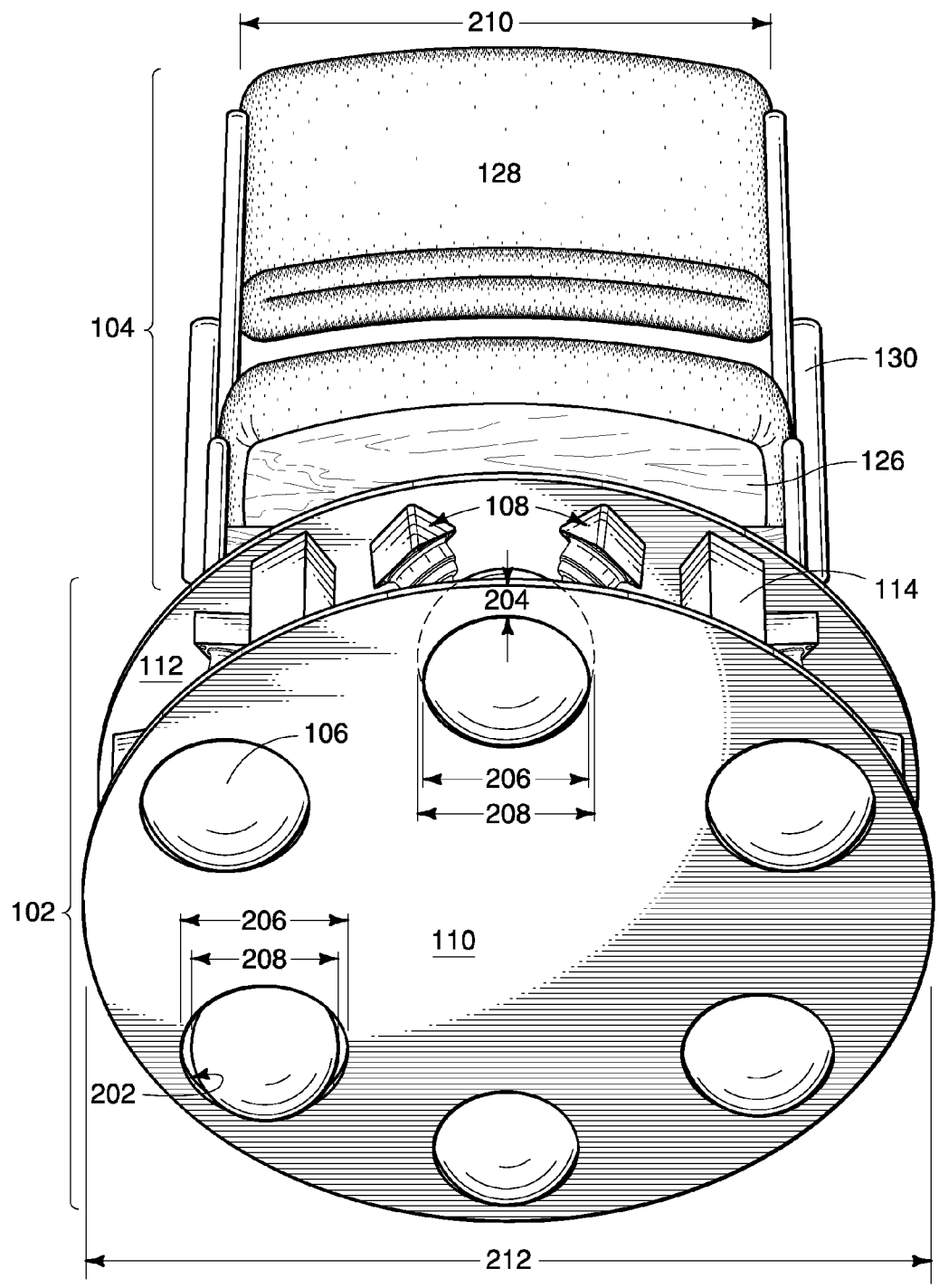
FIG. 2 is a bottom perspective view of the first exemplary implementation shown in FIG. 1.

FIG. 2 is a bottom perspective view of the exemplary implementation shown in FIG. 1. With reference to FIG. 2, six spheres 106 are installed substantially evenly around the periphery of the base 102. Apertures 202, one for each sphere 106, allow the spheres 106 to contact a surface (not shown). Each aperture 202 may be of any design, shape or profile. The spheres 106 and apertures 202 are each located their own distance 204 from an edge or side of the bottom plate 110. Such distance may be the substantially the same for all spheres 106 depending on the geometry and shape of the bottom plate 110 and top plate 112. The bottom plate 110 and top plate 112 may be of different sizes, different shapes, or different orientations relative a fixed point or plane.

In one implementation, a size (e.g., diameter, side measurement, circumference) of the aperture 202 is smaller than a size of the respective sphere 106. Such is not required. A size of the aperture 202 may be larger than a size of the respective sphere 106. In a preferred implementation, the diameter 206 of the aperture 202 is smaller than the largest diameter 208 of a respective sphere 106. In such a configuration, the sphere 106 is not free to exit the aperture 202 when the assembly 100 is picked up or during assembly or adjustment of the assembly 100 or base 102. However, when in operation, each sphere 106 is not in contact with the bottom plate 110, top plate 112 or support member 114. A size 210 of utility piece 104 or working portion may be substantially smaller, substantially the same, or substantially larger than a size 212 of the base 102. In a preferred implementation for a chair (seat 126, back 128 and arms 130) as a utility piece 104, the diameter 212 of a circular base 102 (as shown in FIG. 2) is about a same length as a width 210 of the chair. The diameter 212 of the circular base 102 is sufficiently small so that the base 102 is out of the way of the legs and feet of a person using the chair, but of sufficient size so as to give a desired amount of lateral support to prevent the chair from tipping over. The same is desired for other assemblies such as a cart or bar stool.

In a preferred implementation, three ball transfers 108 are arranged and mounted to the top plate 112 so as to keep a respective sphere 106 in place. At any given time, one or more ball transfers 108 are in contact with a respective sphere 106 to provide support from the respective sphere 106 to the base. In operation, when a sphere 106 rotates, the ball transfers also roll. The sphere 106 and the ball transfers 108 operate in a bearing-style of mechanism.

Figure 3:
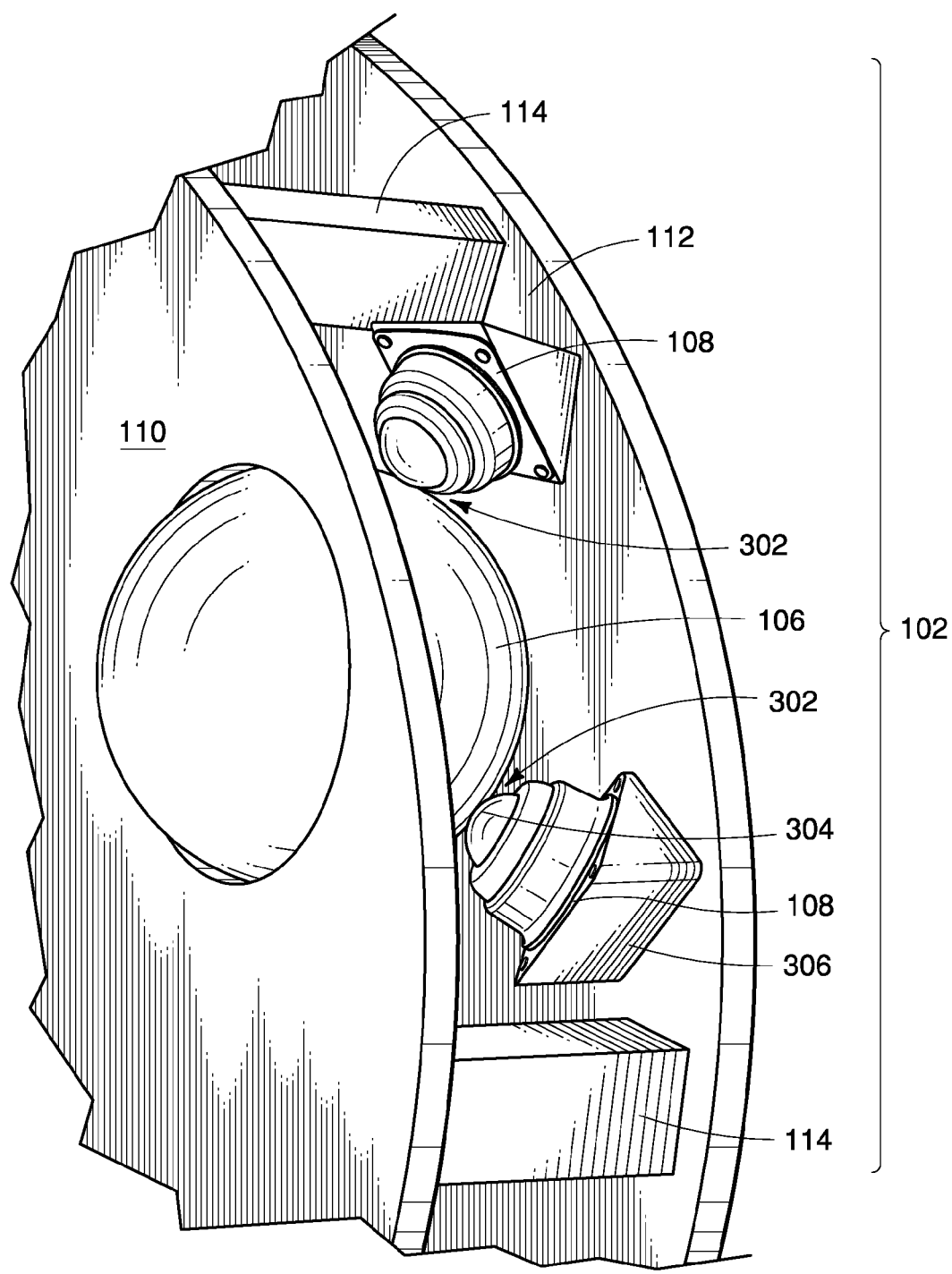
FIG. 3 is perspective close-up view of a portion of the base of the first exemplary implementation shown in FIG. 1.

FIG. 3 is perspective close-up view of a portion of the base 102 of the first exemplary implementation shown in FIG. 1. With reference to FIG. 3, a sphere 106 is shown disposed near or against three ball transfers 108, where two of three ball transfers 108 are visible. Other numbers of ball transfers 108 are possible or desirable for each sphere 106. Further, any number of spheres 106 may be used for the base 102. When a load is placed against the base 102 (e.g., such as when a person sits in a chair), one or more of the ball transfers 108 resist the load when in contact with the sphere 106 at a point of contact 302. In a preferred implementation, lateral motion of the base 102 occurs when the sphere 106 rolls across a surface (not shown). In turn, each of the ball transfers 108 rolls or otherwise actuates. A relatively small area or point of contact 302 translates into a low amount of friction when the sphere 106 rolls. In one implementation, a ball transfer 108 includes a ball 304 held inside a housing by a collar or ring. The ball transfer 108 is preferably disposed at an angle relative to a plane associated with the top plate 112. A wedge 106 or other means may be used to position and fix the ball transfer 108 relative to the sphere 106. A braking system (not shown in FIG. 3) may include a mechanism to have the sphere 106 engage the bottom plate 110 or top plate 112 so as to prevent motion or rolling of the sphere 106. Other means may be used to prevent the rolling of the spheres 106 as part of a braking system.

Figure 4:
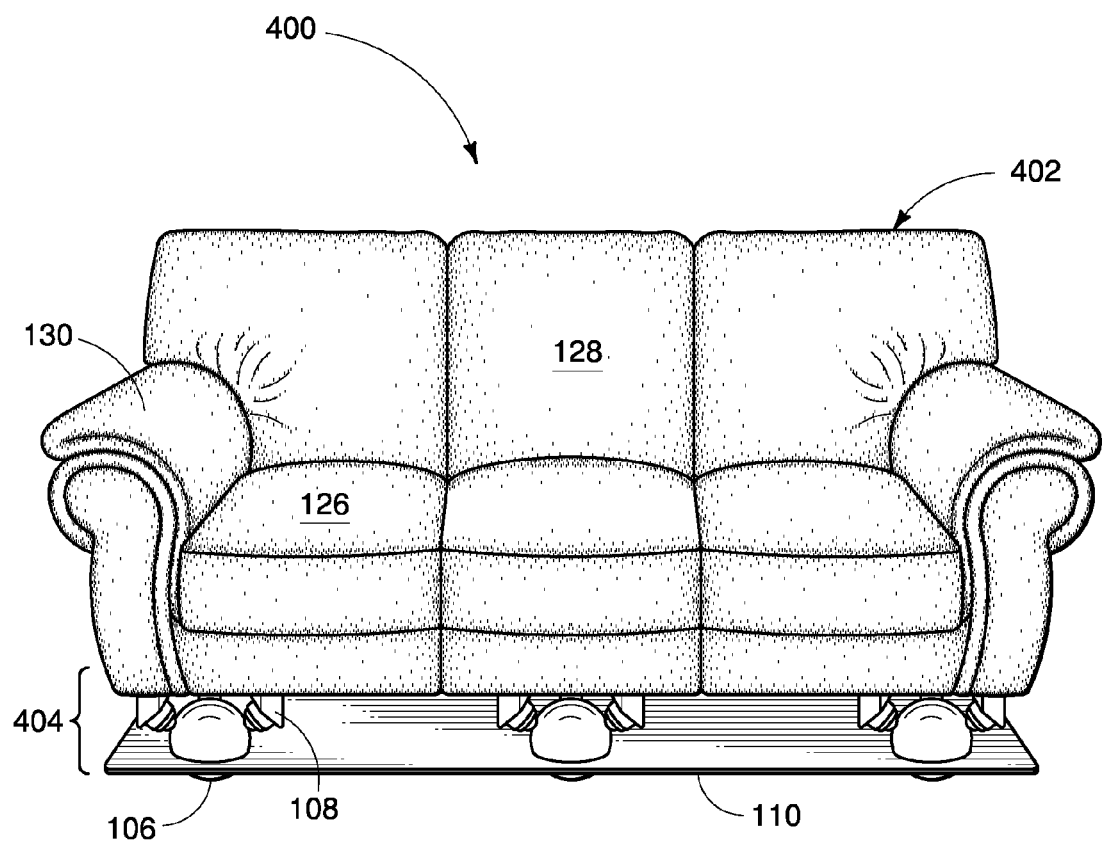
FIG. 4 is a front perspective view of a couch or assembly according to a second exemplary implementation of the invention.

FIG. 4 is a front perspective view of an assembly 400 according to a second exemplary implementation of the invention. With reference to FIG. 4, an assembly 400 includes a couch 402 portion that has been affixed to a base or set of base components 404. The base components 404 include a base plate 110, a set of sphere 106 and a set of ball transfers 108 for each respective sphere 106. The operation of the spheres 106 is substantially like that described in relation to FIGS. 1-3. The spheres 106 are disposed at various points under the couch 402. These points may be recessed from the front, back and sides of the couch 402 so that a typical person would not see some or all of the base components 404 when viewing the couch from a standing position or a sitting position in front of the couch 402. The couch 402 includes seats 126, a back 128 and arms 130. The base plate 110 may be one piece or may take the form of several smaller plates, rings, braces, etc. so as to prevent the spheres 106 from escaping proper placement on or near the ball transfers 108, especially when the couch assembly 400 is lifted. The couch assembly 400 may be moved across a surface in any direction, as the spheres 106 are free to move in any direction. A braking mechanism (not shown) may resist lateral movement of the couch assembly 400 when the braking mechanism is engaged.

Figure 5A:
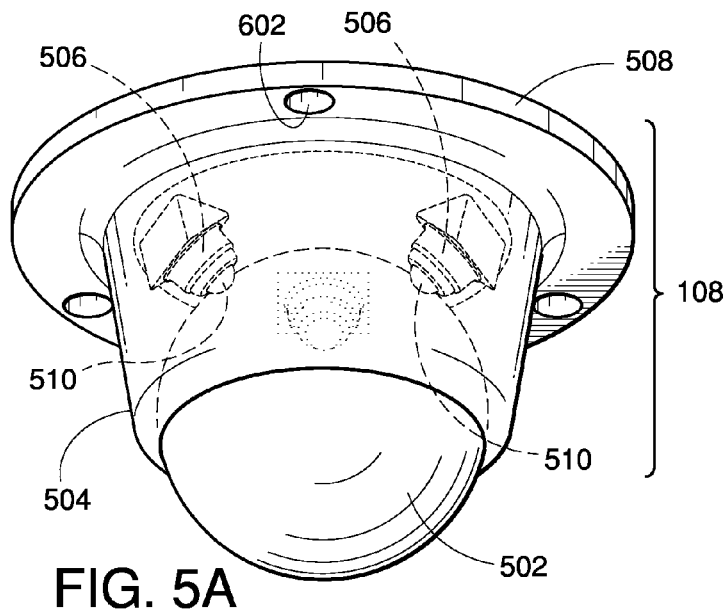
FIG. 5A is a front perspective close-up view of an exemplary implementation of a ball transfer such as one shown in FIG. 1.

FIG. 5A is a front perspective close-up view of an exemplary implementation of a ball transfer 108 such as one shown in FIG. 1. With reference to FIG. 5A, a ball transfer 108 includes a ball, sphere, roller, cylinder or other moveable element 502 that contacts a sphere (not shown in FIG. 5A, such as a sphere or ovoid 106 shown in FIG. 1). A housing 504 maintains or assists in maintaining the ball 502 inside the ball transfer 108. A bearing case 506 houses or includes a ball bearing 510 in position inside of the ball transfer 108. A mounting structure 508 allows for assembly of the ball transfer 108 to a surface or location on an item. While an overall circular shape for the mounting structure 508 of the ball transfer 108 is shown, other shapes and configurations are envisioned including a square-shaped mounting structure or a structure for mounting the ball transfer 108 at a corner or along an edge of an item.

Figure 5B:
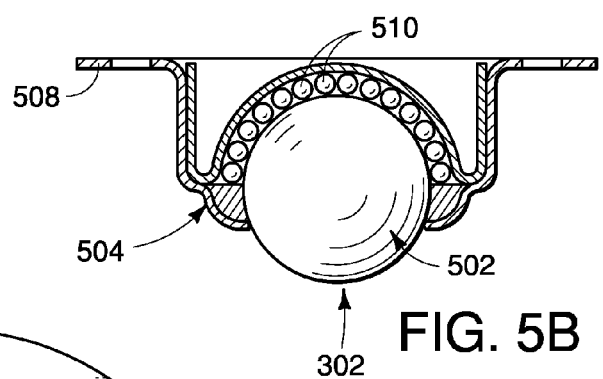
FIG. 5B is a side cut-away view of a second exemplary implementation of a ball transfer such as one shown in FIG. 1.

FIG. 5B is a side cut-away view of a second exemplary implementation of a ball transfer such as one shown in FIG. 1. With reference to FIG. 5B, a ball 502 is located or housed inside a housing 504. The housing 504 facilitates maintenance of bearings 510 inside the ball transfer. A relatively large number of bearings, spheres, ovoids, rollers, etc. may be maintained inside the ball transfer 108. In this way, the ball transfer may support an increased load at a point of contact 302 with the ball transfer. Further, a smooth rolling or operation of the ball transfer may be performed. A mounting structure 508 facilitates mounting of the ball transfer to a surface or location.

Figure 6:
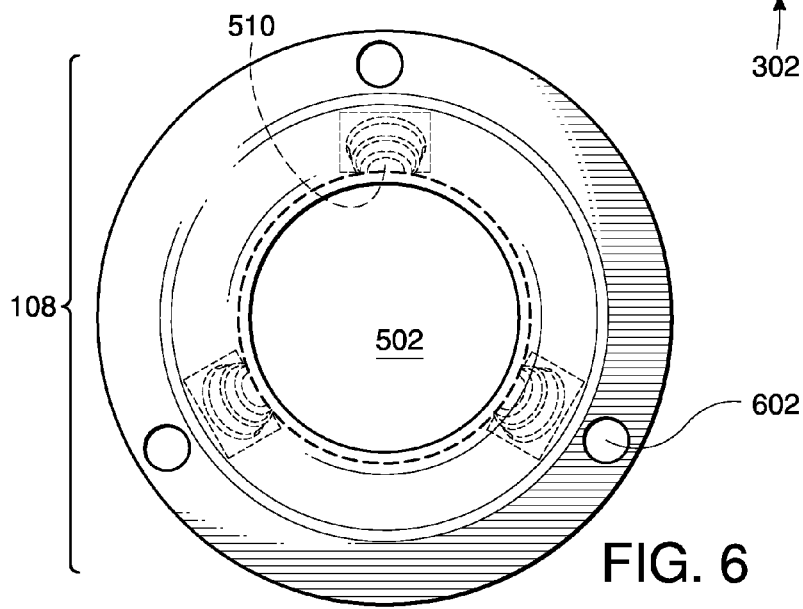
FIG. 6 is an overhead view of an exemplary implementation of a ball transfer such as one shown in FIG. 1.

FIG. 6 is an overhead view of an exemplary implementation of a ball transfer such as one shown in FIG. 1 and FIG. 5A. With reference to FIG. 6, bearing 510 are located at various places inside the housing and mounting structure of the ball transfer 108. Apertures 602 allow for screws, nails or other means for affixing the ball transfer 108 to a surface or location.

In general, according to one aspect of the present invention, a base, such as base 102, provides increased stability as compared to known castors, wheels, etc. Instead of a typical castor or wheel that travels in a track or wide path, a sphere rolls in any direction at any given time. Even swivel, double-wheel castors suffer from the drawback that one must encourage the castor to roll in a desired direction. This is sometimes very difficult when laterally moving something very heavy across a thick carpet or rug. The increased stability of the invention derives from, for example, (1) one or more properties of the material that makes up the spheres, (2) increased strength of the design of the base, and/or (3) increased points of contact with a surface over which one desires to move something. One result of the increased stability is that a chair, barstool or cart is more difficult to roll over. Further, there is increased stability due to the spheres being able to travel more easily than previously known over uneven surfaces or objects. For example, door jams can provide a substantial obstacle for castors such as when moving music equipment in boxes into a music hall.

Another aspect of the invention provides for a system that facilitates movement of office chairs, desks, couches, refrigerators, tables, shopping carts, moving cases and other movable appliances, furniture and the like. With less surface area in contact with a surface, and with relatively less rolling friction, the base or apparatus travels with less lateral force needed to start and move it.

In another aspect, the spheres cause less wear on surfaces such as carpets and rugs. For an embodiment with spheres, reduced wear derives at least in part from the shape of the spheres and type of contact between a surface and the spheres. For example, with a castor, the wheel of the castor causes the wheel's two edges to sharply impact the carpet fibers as compared to the carpet fibers just outside the reach of the wheel. Motion of the castor can leave a track pressed into the carpet fibers. The wear avoided by the instant invention may be temporary wear and permanent wear. Thus, the invention may prolong the life of some surfaces and floors.

The implementations described herein, and those taught to those of the art, are advantageous to many types of users including home owners, retail consumers, trade show vendors, business owners, home repairers, electricians, movers, yard workers, mechanics and others who need to laterally move items across a surface. The implementations described herein can provide significant time savings and utility over known mechanisms.

The foregoing discussion has been presented for purposes of illustration and description. Various features from one implementation can be combined with other features from other implementations. The description is not intended to limit the invention to the form or forms disclosed herein. Consequently, variation and modification commensurate with the above teachings, within the skill and knowledge of the relevant art, are within the scope of the present invention. The implementations described herein and above are further intended to explain the best mode presently known of practicing the invention and to enable others skilled in the art to use the invention as such, or in other implementations, and with the various modifications required by their particular application or uses of the invention. It is intended that the appended claims be construed to include alternate implementations to the extent permitted.

I claim:

1. An assembly comprising:
a utility apparatus;
a support stem affixed at its top portion to the utility apparatus; and
a base affixed to a bottom portion of the support stem, wherein the base includes:
a top plate;
a bottom plate;
a plurality of spheres distributed in a plane that is substantially parallel to a rolling surface, wherein the spheres contact the rolling surface when in operation, wherein the spheres protrude through the bottom plate and contact the rolling surface when in operation; and
a set of rolling transfers mounted to the top plate of the base for each of the plurality of spheres, wherein each rolling transfer is mounted above a midline circumference of a respective sphere and is capable of rolling when in contact with a respective sphere.

2. The assembly of claim 1, wherein the spheres are distributed substantially uniformly along a periphery of the base.

3. The assembly of claim 1, wherein the rolling transfers are generally spherical in shape.

4. The assembly of claim 3, wherein the rolling transfers are generally cylindrical in shape.

5. The assembly of claim 1, wherein at least one of each set of rolling transfers is a ball transfer.

6. The assembly of claim 1, wherein the set of retainers form a substantially planar plate, wherein an aperture is formed for each of the spheres to contact the rolling surface.

7. The assembly of claim 1, wherein the utility apparatus comprises:
a basket.

8. The assembly of claim 1, wherein the utility apparatus comprises:
a couch.

9. The assembly of claim 1, wherein the utility apparatus takes the form of a barstool.

10. The assembly of claim 1, wherein the utility apparatus comprises:
a chair.

11. A system for facilitating lateral movement across a surface, the system comprising:
a utility apparatus;
a support stem affixed at its top portion to the utility apparatus;
a top plate affixed to a bottom portion of the support stem;
a bottom plate;
spheres distributed in a plane that is substantially parallel to the surface, wherein the spheres contact the surface when in operation, and wherein the spheres protrude through the bottom plate and contact the surface when in operation; and
a set of ball transfers for each sphere, wherein the ball transfers are mounted to the bottom plate, and wherein each ball transfer is mounted above a midline circumference of a respective sphere.

12. The system of claim 11, wherein each of the spheres is made from a plastic.

13. The system of claim 11, wherein each of the spheres is made of a compressible substance.

14. The system of claim 11, wherein the system further comprises a braking component, wherein the braking component employs one or more of the top plate and bottom plate to contact a respective sphere.

15. The system of claim 11, wherein the system further comprises a braking component, wherein the braking component employs a support structure to move a surface into contact with one or more of the spheres to actuate braking.

16. The system of claim 11, wherein each of the spheres is at least 4 inches in diameter.

17. The system of claim 11, wherein the utility apparatus comprises:
a chair.

18. The system of claim 11, wherein the utility apparatus comprises:
a couch.

19. The system of claim 11, wherein the utility apparatus comprises:
a basket.

* * * * *